United States Patent
Fang et al.

(10) Patent No.: US 9,022,896 B2
(45) Date of Patent: May 5, 2015

(54) HIGH EFFICIENT AND HIGH POWER PLANE CENTRIC GEAR UNIT

(76) Inventors: Zupeng Fang, Jiangsu (CN); Dan Fang, Jiangsu (CN); Fang Fang, Jiangsu (CN); Yafeng Zhao, Jiangsu (CN)

(*) Notice: Subject to any disclaimer, the term of this patent is extended or adjusted under 35 U.S.C. 154(b) by 0 days.

(21) Appl. No.: 13/603,449

(22) Filed: Sep. 5, 2012

(65) Prior Publication Data

US 2013/0059693 A1    Mar. 7, 2013

(30) Foreign Application Priority Data

Sep. 5, 2011    (CN) .......................... 2011 1 0259189

(51) Int. Cl.
  *F16H 57/08*    (2006.01)
  *F16H 1/32*    (2006.01)

(52) U.S. Cl.
  CPC ....................................... *F16H 1/32* (2013.01)

(58) Field of Classification Search
  USPC ......................................... 475/162, 180, 331
  See application file for complete search history.

(56) References Cited

U.S. PATENT DOCUMENTS

2010/0084872 A1* 4/2010 Winiasz ..................... 475/162

* cited by examiner

*Primary Examiner* — Derek D Knight
(74) *Attorney, Agent, or Firm* — Tianhua Gu; Global IP Services

(57) ABSTRACT

A plane centric gear unit has a circumferentially floating ring gear 1. Both ends of the ring gear 1 are respectively fixed with cloth boards 3 equipped with hollow shaft sleeves 4; the reaction forces of the ring gear 1 and external gear 2 are equal and in opposite directions, and act on inner ring bearings 7 of the hollow shaft sleeves 4 on the same straight line; the outer ring bearings 8 of the hollow shaft sleeves 4 are unloaded, therefore the sum of the bearing reaction forces is reduced, the total transmission efficiency and power reaches above 97% and tens of thousands KW grade, the noises are lower, the gear surface contact pressure is about 1/10 of the external mesh pair, the gear surface contact life is increased by 1000 times than the external mesh pair, and the total weight is reduced by 2~3 times.

6 Claims, 3 Drawing Sheets

HIGH EFFICIENT AND HIGH POWER PLANE CENTRIC GEAR UNIT

CROSS REFERENCE TO RELATED PATENT APPLICATION

Figure 1:
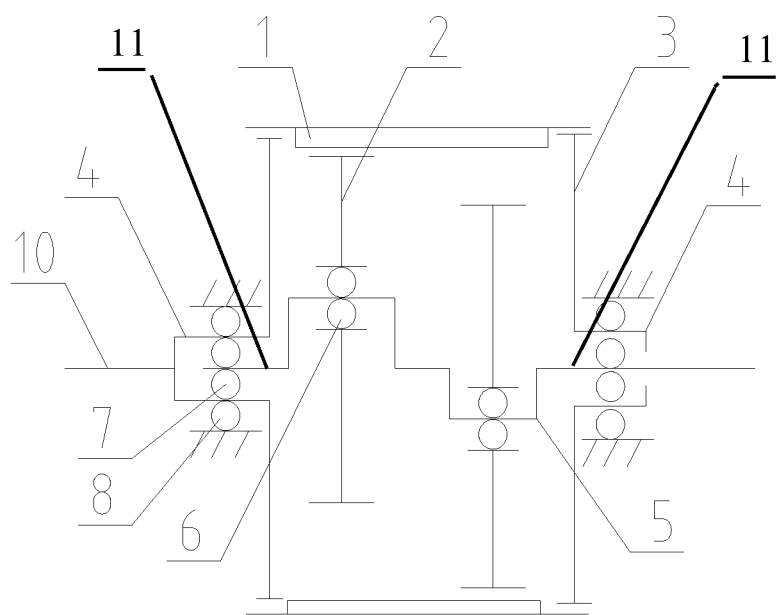

This application claims the priority of the Chinese patent application No. 201110259189.2 with filing date of Sep. 5, 2011, which application is incorporated herein by reference.

FIELD OF THE INVENTION

The invention relates to the planocentric gear unit for increasing and decreasing speed, catalogue of the mechanical transmission industry.

BACKGROUND OF THE INVENTION

The planocentric gear unit (conventional name in foreign countries) has advantages of small volume, light weight, low noise, low mesh linear velocity, small contact stress and so on, in the current situation of our country, the planocentric gear unit and the cycloidal pin wheel reducer commonly occupy the main market of small and medium power with large speed ratio; although it has marry structure types, the common disadvantage is unsatisfactory transmission efficiency (including the cycloidal pin wheel type). The SCC series planocentric gear units developed by our inventor was authenticated by Yangzhou City Science and Technology Commission on 29, Aug. 1985, and $SCC_{II}$ series plane centric gear units was authenticated by Jiangsu Science and Technology Commission in 1988, and our utility model ZL88211046.2 A Rolling Hinge Pin Bushing Output Mechanism (Refer to the copy of the authentication certificate) was used, however the efficiency was still not ideal enough, especially the efficiency in high power and super-high power transmissions was a very sensitive problem; taking a 10000 KW increasing gear/reducing gear for example, 1% efficiency means 100 KW energy consumptions or incomes; at present 1000~2000 KW wind generator increasing gears unit manufactured in our country mostly adopt level 2 set NOW planetary unit comprising external gears, they have high machining precision and large tooth profile contact stress (as high as 80~100 kg/mm² or higher), low contact stress of the corresponding planocentric gear trains is about 8~10/mm² or lower, the noises thereof is generally below 70 dB, but the transmission efficiency thereof fails to rank in thousand KW grade, and the noises of the corresponding NGW planetary gear trains are about 80 dB.

In the prior art, speed reducing gear units for ships, in particular for large ships mostly adopt external mesh reducing gears, which usually use high/lower speed diesel engines or gas turbines as the motive power, the speed ratio of the reducing gears is between 4~8; however when high speed diesel engines or gas turbines are used as the motive power (n≈3000~6000 r.p.m), the weight of the onboard prime motor can be reduced greatly, the speed ratio of the reducing gear can be increased to 30 times or higher correspondingly; comparatively speaking, if an external mesh transmission is used, the structure is very huge.

SUMMARY OF THE INVENTION

The invention relates to a planet type gear unit, in particular a planocentric gear unit, wherein a circumferentially floating ring gear (1) is provided, both ends of the ring gear are respectively fixed with cloth boards (3); every centers of the cloth boards (3) are respectively provided with hollow shaft sleeves (4), bearings (7) installed in the inner rings of the hollow shaft sleeves (4) support the spindles (11) in both ends of the eccentric wheel (5), the outer rings of the hollow shaft sleeves (4) are installed with bearings (8), the outer rings of the bearings (8) are fixed on a stationary part; the end face of one hollow shaft sleeve (4) is fixed with an output (input) shaft (10), the spindle in one end of the eccentric wheel (5) passes through the end face of another hollow shaft sleeve (4); the ring gear (1) meshes with one and more external gears (2), the center part of each external gear is supported on a tumbler bearing (6); when multiple external gears (2) are used, the circumferential included angles set by the eccentric wheel (5) axially are equal, therefore a planocentric gear unit is formed. When the cloth boards (3) are manufactured to a structure without holes to constitute the power transmission gear without a stationary part shell and output (input) shafts (10), bearings (7) and bearings (8) can be in the same planes also can be indiffert planes, the ring gear (1) forms a radially-output transmission gear. The tooth profile of the mesh pair can be involute, cycloid and arc.

Principle of the Invention

As the planocentric mesh pair has a low mesh linear velocity, generally the linear velocity of small power is about 1 m/sec, however the mesh linear velocity of the external mesh pair with the same power can be as high as 10~15 m/sec, therefore the tooth surface mesh power consumption of the planocentric mesh pair is only about 1%; but the mesh power consumption of the external mesh pair can be as high as 3~5%, this is because that the external mesh linear velocity is much higher than the planocentric mesh pair, and in the involute tooth profile mesh movement between them is rolling and sliding mode (Refer to Wear Control Hand Book), for the planocentric mesh pair, the main power consumption parts are the bearings, in particular the hinge pin output mechanism and its tumbler bearing; taking the above-mentioned SCC series 3[#] set for example (Refer to p703-704 of the second of Mechanical Design by the Chemical Industry Press): tangential mesh force of the external gear $F_t$=304 kg, the sum of the acting forces on the hinge pin $F_\Sigma$=601 kg, radial force on the tumbler bearing $F_R$=893 kg, reaction force on the high speed shaft $R_1$=293 kg, so the total reaction forces of the bearings (including the hinge pin) $F_\Sigma$≈787 kg, which is equal to 6 times of the mesh force, therefore known from the experiment and calculation, the reaction force of each $F_t$ on the bearings consumes 1.5~2% of the total power; however in our invention as the mesh forces of the ring gear 1 and external gear 2 are equal in opposite directions, and act on the bearings 7 on the same straight line, hence the bearings 8 are unloaded; if the cloth board 3 is provided on one end, then the bearings 8 must be arranged in double rows and the reaction force at this point can reach above 2 times of $F_n$, therefore the efficiency is very low and as the cantilever type mesh is used, the contact force of the tooth surface is uneven, it can hardly be adapt to high power and multiple external gears structures, the sum of the tumbler bearing reaction force and the reaction force is only 1.5 $F_t$, therefore a mesh pair with higher transmission efficiency than NGW planetary type and other external mesh pairs can be obtained definitely, meanwhile the planocentric has incomparable advantages than other mesh pairs, hence our invention can be ranked in the transmission catalogue of high and super-high tens of thousands KW grade with high transmission efficiency, for example: providing high-tech equipments for giant sea ships and main transmission systems of the wind generation industry. Recently, the inventor knows from the related application project that the social relevant departments all hope a high power speed increasing gear/reducing gear with high efficiency and excellent performance can be invented. We have developed SCC series planocentric reducing gear for 28 years till now, and the first inventor of our invention has engaged in mechanical transmission design for 57 years.

Advantages of the Invention

1. In our invention, the sum of the tumbler bearing counterforce and reaction force of the high speed shaft end are reduced to 1.5 times of the mesh force from 6 times of the mesh force of the conventional hinge pin type output mechanism, namely $\Sigma F_R \leq 1.5 F_t$, the mesh power consumption is only about 1%, the total transmission efficiency can reach above 97%, the speed ratio of a single set can reach above 100, therefore our invention can be ranked (ranked first) in the high power/super high power speed increasing/reducing gear class with large speed ratio and high efficiency.

2. The noises are lower than the external mesh pair by 8~10 dB under the same machining precision.

3. The contact stress is only about $\frac{1}{10}$ of the external mesh pair, so damages caused by high tooth surface contact stress can be removed; in accordance with the explanation in Wear Control Hand Book Table 4, when the contact stress is 2070 $N/mm^2$, the service life is $10^5$ period, however when the contact stress is 1000 $N/mm^2$, the service life is $10^7$ period, it can be seen that when the contact stress is reduced by 1 time, the service life can be enhanced by 100 times, hence the tooth surface service life of our invention is enhanced by 1000 times than the external mesh pair.

4. Our invention has simple structure; as the bending stress of the teeth is the main stress, our invention has good bearing capacity, small volume and low cost, and the total weight can be reduced by 2~3 times.

DESCRIPTION OF THE PREFERRED EMBODIMENTS

The preferred embodiment of our invention is further described as follows with combination of attached figures.

Figure 2:
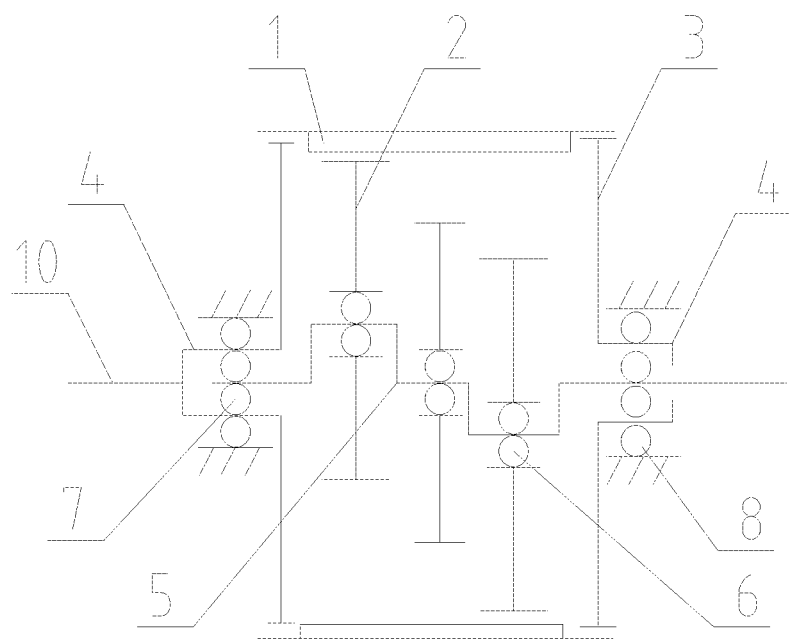
Figure 3:
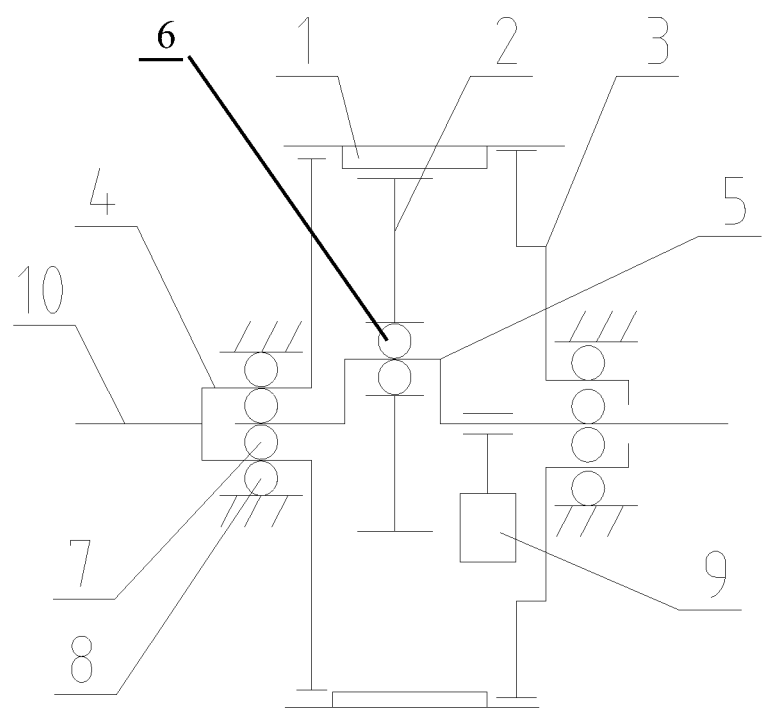

FIG. 1 is a mesh pair with double external gears;
FIG. 2 is a mesh pair with three external gears;
FIG. 3 is a mesh pair with a single external gear.
1. Ring Gear
2. External Gear
3. End Face Cloth Board
4. Hollow shaft Sleeve
5. Eccentric Wheel
6. Tumbler Bearing
7. Bearing
8. Bearing
9. Counter Weight
10. Input (output) Shaft The preferred embodiment of our invention is the mesh pair with double external gears which needs no counter weight and is in favor of motion and quiescence balance and reducing the amplitude and noises; as the contact stress is very small, generally it can meet requirements by using hardened and tempered steels, in this way the cost is reduced, the precision is enhanced, and quenching and deformation of the tooth surface can be avoided, however the mesh pair with three external gears and hard-face gear can be used in a super high power device. The machine tools for implementing the invention comprise universal machine tools, gear hobbing machines, gear shaping machines and so on.

What is claimed is:

1. A planet type gear unit comprising: a circumferential floating ring gear (I); two cloth boards, fixed on a left and a right axial end of the ring gear respectively, each cloth board has a hollow shaft sleeve at a center of the cloth board, a first pair of bearings, one on each of the hollow shaft sleeves, an outer ring of each bearing is fixed on a stationary part of the planet gear unit, thereby the cloth boards are turn-able relative to the stationary part of the planet gear unit; an eccentric wheel, constructed by two spindles, each spindle having concentric axis at both ends of the eccentric wheel, and a multiple of eccentric shafts at the middle of the eccentric wheel, the two spindles extend into the two hollow shaft sleeves and are supported therein by a second group of bearings respectively; a multiple of external gears on the multiple of eccentric shafts are supported through a third group of bearings, each of the multiple of external gears are meshed with the ring gear forming meshed pairs respectively, included angles of each of the multiple of eccentric shafts, in a plane which is vertical to the axis of the eccentric wheel, are equal; an output fixed with the left hollow shaft sleeve has a same axis with the eccentric wheel, which is an input.

2. The planet type gear unit according to claim 1, wherein the ring gear outputs a rotation out of the transmission 3. The planet type gear unit according to claim 1, wherein bearings of the second group and bearings of the first group are in the same plane.

4. The planet type gear unit according to claim 1, wherein a tooth profile of each of the meshed pair is involute, cycloid or an arc.

5. The planet type gear unit according to claim 1, wherein the multiple of external gears are a single external gear, the multiple of eccentric shafts are a single eccentric shaft, the third group of bearings is a single bearing.

6. The planet type gear unit according to claim 1, wherein the output is used as an input shaft, and the eccentric wheel is used as an output shaft.

\* \* \* \* \*